United States Patent [19]

Sakoe

[11] Patent Number: 4,694,493
[45] Date of Patent: * Sep. 15, 1987

[54] SPEAKER VERIFICATION SYSTEM

[75] Inventor: Hiroaki Sakoe, Tokyo, Japan

[73] Assignee: NEC Corporation, Tokyo, Japan

[ * ] Notice: The portion of the term of this patent subsequent to Apr. 8, 2003 has been disclaimed.

[21] Appl. No.: 591,652

[22] Filed: Mar. 20, 1984

[30] Foreign Application Priority Data

Mar. 30, 1983 [JP] Japan ............................ 58-54132

[51] Int. Cl.⁴ .............................................. G10L 5/00
[52] U.S. Cl. ................................................... 381/42
[58] Field of Search ................................... 381/42, 43

[56] References Cited

U.S. PATENT DOCUMENTS

Re. 31,188  3/1983  Pirz et al. .............................. 381/43
4,053,710 10/1977  Adrani et al. ......................... 381/42
4,256,924  3/1981  Sakoe .................................... 381/43
4,559,604 12/1985  Ichikawa et al. ................... 364/513.5
4,581,755  4/1986  Sakoe .................................... 381/42

Primary Examiner—E. S. Matt Kemeny
Attorney, Agent, or Firm—Sughrue, Mion, Zinn, Macpeak, and Seas

[57] ABSTRACT

A voice verification system in which multiple generic reference patterns are obtained by speaking the password in a number of different ways and in which a speaker specific reference pattern is generated by the speaker undergoing registration. A subset of the generic reference patterns are selected having the greatest similarity to the registered speaker's pattern. During verification, the speaker's identity is verified if the dissimilarity between the input pattern and the registered speakers reference pattern is both less than any dissimilarity between the input pattern and the selected generic reference patterns and also less than a threshold value.

9 Claims, 2 Drawing Figures

SPEAKER VERIFICATION SYSTEM

BACKGROUND OF THE INVENTION

The present invention relates to a speaker vertification system.

Systems in which a spoken password is compared with a password which has been registered in advance, to determine whether the speaker is the registered person, are called "speaker verification systems". It is thought that these systems will be useful as identification-verifying means in banks or check-in and check-out control systems, and practical realization thereof is expected.

A conventionally developed speaker verification system is practised in the following manner. In this system, the voice pattern of a passwork spoken by a registered speaker is stored as a reference pattern A and, during verification, an input password voice pattern X spoken by the speaker is compared with the reference pattern and the dissimilarity $D(X, A)$ therebetween is calculated. If the dissimilarity is less than a predetermined threshold value $\theta$, it is recognized that the input voice pattern coincides with the reference pattern, and the speaker is judged to be the registered person. Conversely, if the dissimilarity is greater than the threshold value $\theta$, it is recognized that the two patterns do not coincide, and the speaker is judged to be an impostor.

The reliability of the prior art voice recognition system which has the function of verifying the speaker as described above is greatly influenced by the magnitude of the threshold value $\theta$. There are two different kinds of erroneous operation of the speaker verification system, i.e., a false rejection of the true registered speaker as an impostor, and a false acceptance of an impostor as the true registered speaker. When the threshold value $\theta$ is reduced, the possibility of false rejections can be reduced, but the possibility of false acceptances is increased. Conversely, if the threshold value $\theta$ is increased, false rejections can be reduced, but false acceptances are increased.

When applied to person verification in banks or check-in and check-out systems, it is thought that the threshold value $\theta$ should be set to be rather low, in view of the seriousness of the result that might occur from a false acceptance. This inevitably leads to a system in which, when there is a false rejection, the speaker must pronounce the password repeatedly until it is correctly accepted. This system, however, leads to a reduction in service with speaker verification in banks, or to the inconvenience of blocked doorways with check-in and check-out systems. Moreover, it is difficult to set a suitable threshold value in this system. As a result, the following problems are caused. Even when the same person pronounces the predetermined password, the voice pattern changes each time, and the degree of change is different for each person. If the threshold value is set at a strict (or low) value, therefore, it often happens that a true registered speaker is recognized as an impostor. Conversely, of the threshold value is set at a rather loose (or high) level, it follows that an impostor could be erroneously recognized as a true registered speaker.

A system which has improved on these problems has been proposed by us, the inventors (in U.S. patent application Ser. No. 436,978). According to this proposed system, not only the reference pattern of a password, but also voice patterns which are similar to but different from the password are registered as control reference patterns. The speaker is recognized to be the registered person, and a coincidence signal is generated, only when the distance obtained as a result of matching with an input pattern satisfies the following conditions:

(a) The distance from the reference pattern is less than the distance from the control reference patterns; and (b) The distance from the reference pattern is less than a predetermined threshold value.

According to this system, because of judgement condition (a), the threshold value used in condition (b) can be loosely set. This provides the results that false recognitions of true registered speakers as impostors are reduced, and that false acceptances of impostors as true registered speakers can be prevented by condition (a).

This system, however, has the problem that control reference patterns must be registered by each person. Especially in the case of the general public use, this would increase false or erroneous operations due to the arbitrary selection and registration by each person of the control reference patterns.

SUMMARY OF THE INVENTION

It is, therefore, an object of the present invention to provide a speaker verification system which is capable of reducing erroneous recognitions and registration work.

Another object of the present invention is to provide a speaker verification system which eliminates the problems in its operation.

A further object of the present invention is to provide a speaker verification system which is extremely secure and safe.

According to a feature of the present invention, a speaker verification system is provided comprising: a first memory for storing, as control reference patterns, patterns which are obtained by speaking a predetermined password under a plurality of predetermined conditions, a second memory for storing, as a verification reference pattern corresponding to a registered speaker, a pattern which is obtained by the utterance of the password by the registered speaker, means for selecting a predetermined number of control reference patterns from the first memory consecutively, from those which are the most similar to the verification reference pattern corresponding to the registered speaker, means for determining, during verification, a first dissimilarity between the input pattern obtained by the speech of the person being verified and the verification reference pattern corresponding to the registered speaker, and second dissimilarities between the input pattern and the selected control reference patterns, and means for outputting a confirmation signal when the first dissimilarity is less than both the second dissimilarities and a predetermined threshold value.

DESCRIPTION OF THE PREFERRED EMBODIMENTS

The present invention uses, as a control reference, patterns obtained when a plurality of predetermined persons speak an identical password, in this way it differs from the previous U.S. patent application in which patterns obtained by the utterance of words similar in pronunciation to a verification reference pattern are used for each registered speaker. As a result, the registration of the control reference patterns is done once, and no operational problemss occur.

Figure 1:
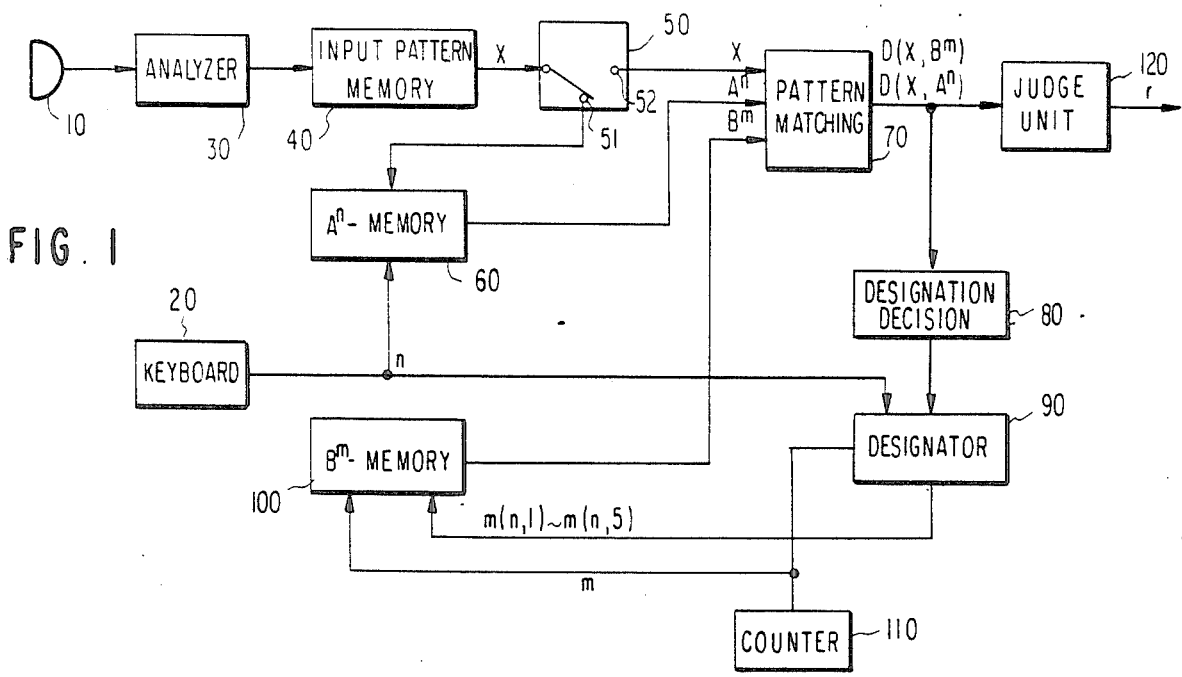
FIG. 1 is a block diagram of an embodiment of the speaker verification system according to the present invention.

Referring to FIG. 1, a control reference pattern memory 100 holds password voice patterns of a large number of people. For example, the memory 100 holds the patterns of the word "Mississippi (with the pronunciation /mis ə sípi/) spoken by 1,000 people. The set of the control reference patterns is designated by:

$$[B^1, B^2, ---, B^m, ---, \text{and } B^{1000}].$$

Each control reference pattern $B^m$ is expressed, as in the previous U.S. patent application, by a time series of characteristic vectors.

The operation of the present system is divided into two modes, registration and verification. A switch 50 is transferred to a terminal 51 in registration mode and to a terminal 52 in verification mode.

First of all, the operation relating to the registration of the verification reference pattern will be described. A registration number-designating unit 20, such as a keyboard for example, is used to input data on the person being registered, i.e., a registration number n. Subsequently, the password /mis ə sípi/ is input via a microphone 10. This voice is analyzed by an analyzer 30 and is then input to an input pattern buffer 40 (in which the input will be referred to as "input pattern X"). The input pattern X is designated verification reference pattern $A^n$ by the registration number n and is supplied to a verification reference pattern memory 60 through the switch 50.

After that, a counter 110 varies a control reference pattern designation signal m consecutively from 1 to 1000. From the control reference pattern memory 100, accordingly, the control reference patterns $B^m$ are output in sequence from $B^1$ to $B^{1000}$ and are supplied to a pattern matching unit 70.

The pattern matching unit 70 compares the input pattern X and the control reference patterns $B^m$ from the control reference pattern memory 100, and consecutively calculates distances $D(X, B^m)$ between the input pattern X and the control reference pattern $B^m$.

The distances $D(X, B^m)$ are consecutively supplied to a control designation and decision unit 80 in which they are compared with one another so that several differences including the shortest distance to, for example, the fifth shortest distance are determined, and the corresponding numbers m are sent to a control designator 90. The numbers m are assigned in the control designator 90 to the registration numbers n and are stored in the following form:

$$m(n, 1), m(n, 2), --- m(n, 5) \qquad (2).$$

The above-stated processes provide the verification reference patterns $A^n$, and prepare for the control designation, as in expression (2). The processing thus far described is repeated, changing the registration number n, every time a new person is to be registered.

Next the portions of the diagram relating to the verification will be described. A person requiring verification operates the keys of the keyboard 20 to input his registration number n or registration data, and utters the password/mis ə sípi/ through the microphone 10. This password utterance is analyzed by the analyzer 30 in the same way as in registration, and is input as the input pattern X to the input pattern buffer 40.

When the registration number n is input to the verification reference pattern memory 60, the verification reference pattern $A^n$ is accordingly output. In response to this verification reference pattern $A^n$, the pattern matching unit 70 first calculates the distance $D(X, A^n)$ between the input pattern X and the verification reference pattern $A^n$.

Responsive to the registration number n, the control designator 90 outputs a control designation signal in the form of expression (2). In response to this control designation signal, the control reference pattern memory 100 generates the following control reference patterns:

$$B^m: m = m(n, 1), m(n, 2), ---, m(n, 5) \qquad (3)$$

The pattern matching unit 70 compares the reference patterns $B^m$ and the input pattern X sent through the switch 50 and calculates the following distances:

$$D(X, B^m): m = m(n, 1), m(n, 2), ---, m(n, 5) \qquad (4)$$

A judgement unit 120 compares the distances $D(X, A^m)$ and the group of distances in the form of expression (4) to determine that the person being verified is the true registered speaker only if [1]: $D(X, A^n) < D(X, B^m)$, : $m = m(n, 1), m(n, 2), ---, m(n, 5)$, and [2]: $D(X, A^n) < a$ predetermined threshold value.

According to the construction thus far described, effects similar to those of the previous U.S. patent application can be obtained, but each person being verified does not need to speak and register control reference patterns.

The above description directed to the fundamental construction of the present invention uses the case in which distance (or dissimilarity) is used for the comparison of voice patterns. However, a measure such as a correlation, which has inverse magnitude relation with the distance, may be employed. In this modification, the inequality signs of judgement standards [1] and [2] are naturally inverted. It is also possible to conduct the judgement by resorting to judgement condition [1] alone. This judgement is equivalent to the case in which the threshold value of standard [2] is set at a sufficiently high value.

Figure 2:
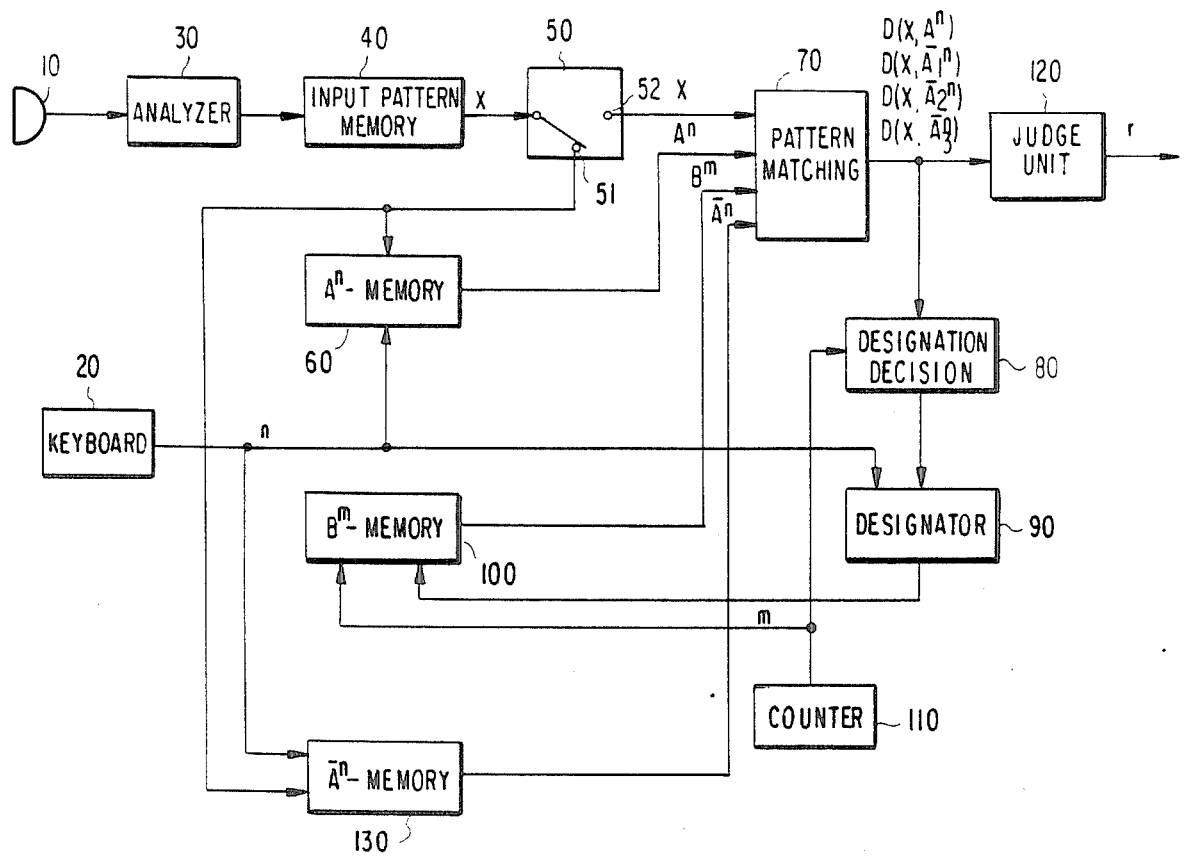
FIG. 2 is a block diagram of another embodiment of the present invention.

FIG. 2 is a block diagram of another embodiment of the present invention. This embodiment can cope with the theft of the password by using the technique of the previous U.S. patent application in combination with the present invention.

In FIG. 2, reference numerals identical to those of FIG. 1 indicate basically identical components. The judgement unit 120 not only has the judgement function of the embodiment of FIG. 1, but also the judgement function of the previous U.S. patent application. Moreover, a control reference pattern memory 130 holds the patterns words such as: /mes ə sípi/, /mis ə sépi/ or /mus ə sípi/, that have a pronunciation similar to that of the password /mis ə sípi/, designated by $\overline{A}_1^n$, $\overline{A}_2^n$ and $\overline{A}_3{}^n$, respectively, and the control reference patterns $\overline{A}_1{}^n$, $\overline{A}_2{}^n$ and $\overline{A}_3{}^n$ of the registered speaker corresponding to the registration number n are supplied to the pattern matching unit 70.

In verification mode, the switch 50 is transferred to the terminal 52. When a person claiming to be the true registered speaker operates the keyboard 20 and speaks the password, the output from the analyzer 30 is supplied to the input pattern buffer 40. In the pattern matching unit 70, the input pattern X from the switch 50 and the corresponding reference patterns $A^n$, $\overline{A}_1{}^n$, $\overline{A}_2{}^n$ and $\overline{A}_3{}^n$ for the registration number n, supplied from the verification reference pattern memory 60 and the control reference pattern memory 130, are compared, and the distances $D(X, A^n)$, $D(X, \overline{A}_1{}^n)$, $D(X, \overline{A}_2{}^n)$ and $D(X, \overline{A}_3{}^n)$ are calculated and then supplied to the judgement unit 120.

Like in the previous embodiment of FIG. 1, the judgement unit 120 uses the group of distances $D(X, B^m)$ of expression (4) obtained in the pattern matching unit 70 to judge that a first stage of verification has been successful, when conditions [1] and [2] are satisfied, i.e., when $D(X, A^n)$ is less than all of $D(X, B^m)$ and the predetermined threshold value $\theta_1$. The minimum distance $D_{min}$ of the distances thus obtained is determined in the judgement unit 120, and it is judged that a second stage of verification has been successful when the reference pattern corresponding to the minimum distance $D_{min}$ is $\overline{A}_n$ and the minimum distance $D_{min}$ less than a threshold value $\theta_2$, namely, $D(X, A^m)$ is less than all of $D(X, \overline{A}_1{}^n)$, $D(X, \overline{A}_2{}^n)$, $D(X, \overline{A}_3{}^n)$ and the value $\theta_2$. When the reference pattern corresponding to $D_{min}$ is either of $\overline{A}_1{}^n$, $\overline{A}_2{}^n$ and $\overline{A}_3{}^n$, or when the minimum distance $D_{min}$ is more than the threshold value $\theta_2$, namely, $D(X, A^n)$ is larger than either of $D(X, \overline{A}_1{}^n)$, $D(X, \overline{A}_2{}^n)$, $D(X, \overline{A}_3{}^n)$ or the value $\theta_2$, on the other hand, it is judged that the second stage of verification is not successful. The judgement unit 120 outputs a determination signal r indicating that the person being verified is the true registered speaker, when the first and second stages verification have been successful.

The second embodiment has a more tedious registration procedure because it uses control patterns for words similar to the password. Since, however, the final judgement is conducted by a logical product of first and second stages of verification, its security and safety are remarkably improved. For example, if the password for the second verification is a secret one which is different for each registered person, and if the password used for the first verification is shared by all the registered people, the possibility of a false acceptance is greatly reduced, even if the common password is stolen, because there is the further difficulty of obtaining the secret password. From the above description, it is apparent that different passwords or the same password can be used a two passwords for the first and second verifications.

What is claimed is:

1. A speaker verification system comprising:
    a first memory for storing, as control reference patterns, patterns which are obtained by speaking a predetermined password under a plurality of predetermined conditions;
    a second memory for storing, as a verification reference pattern corresponding to a registered speaker, a pattern which is obtained by said registered speaker speaking said password;
    first means operating in response to outputs of said first and second memories for selecting control reference patterns from said first memory consecutively, said selected patterns being those that are the most similar to the verification reference pattern corresponding to said registered speaker;
    second means operating in response to outputs of said first memory, said second memory, and said first means for determining, during verification, a first dissimilarity between the input pattern obtained by the speech of a person being verified and the verification reference pattern corresponding to said registered speaker, and second dissimilarities between said input pattern and the selected control reference patterns; and
    third means operating in response to an output of said second means for outputting a confirmation signal when said first dissimilarity is less than all said second dissimilarities and a predetermined threshold value.

2. A speaker verification system according to claim 1, wherein the control patterns which are obtained by speaking under the predetermined plurality of conditions are those which are obtained as a result of a plurality of predetermined persons speaking said password.

3. A speaker verification system comprising:
    an input analyzer for analyzing a word spoken by a speaker, and outputting the result as an input pattern;
    a registration number designator for outputting a registration number;
    an input pattern buffer operating in response to an output of a said input analyzer for storing said input pattern;
    a verification reference pattern memory operating in response to outputs of said input pattern buffer and said registration number designator for storing said input pattern as a verification reference pattern during registration of a speaker, with the number designated by said registration number;
    a control reference pattern memory for storing, as control reference patterns, patterns which are obtained when a plurality of predetermined persons speak a predetermined password;
    a pattern matching unit operating in response to outputs of said input pattern buffer, said verification reference pattern memory, and said control reference pattern memory for determining first dissimilarities between said verification reference pattern and said control reference patterns, a second dissimilarity between a verification input pattern and said verification reference pattern, and third dissimilarities between said verification input pattern and said control reference patterns, said verification input pattern being an input pattern outputted from said input analyzer when a speaker to be verified speaks said word during verification;
    a control reference pattern designator operating in response to an output of said pattern matching unit for selecting a plurality of first dissimilarities having the smallest values among said dissimilarities, to designate the control reference patterns corresponding to the selected first dissimilarities as the control reference patterns corresponding to said registration number; and
    a judgement unit operating in response to an output of said pattern matching unit for generating a confirmation signal when said second dissimilarity is less than both said third dissimilarities corresponding to said designated control reference patterns and a predetermined threshold value.

4. A speaker verification system according to claim 3, further comprising a switch for connecting the output of said input pattern buffer to said verification reference pattern memory during registration and to said pattern matching unit during verification.

5. A speaker verification system comprising:
   an input analyzer for analyzing first and second passwords spoken by a speaker, and outputting the result as input patterns;
   a registration number designator for outputting a registration number;
   an input pattern buffer operating in response to an output of said input analyzer for storing said input patterns;
   a verification reference pattern memory operating in response to outputs of said input pattern buffer and said registration number designator for storing said input patterns as first and second verification reference patterns corresponding to said first and second passwords during registration, with the number designated by said registration number;
   a first control reference pattern memory for storing, as first control reference pattern memory for storing, as first control reference patterns, patterns which are obtained when a plurality of predetermined persons speak said first password;
   a second control reference pattern memory operating in response to outputs of said input buffer and registration number designator for storing, as second control reference patterns, patterns which are obtained when a registered speaker speaks a plurality of words similar in pronunciation to said second password;
   a pattern matching unit operating in response to outputs of said input pattern buffer, verification reference pattern memory and first and second control reference patterns memories for determining first dissimilarities between said first verification reference pattern and said first control reference patterns, a second dissimilarity between a first verification input pattern corresponding to said first password obtained during verification and said first verification reference pattern, third dissimilarities between said first verification input pattern and said first control reference patterns, a fourth dissimilarity between a second verification input pattern corresponding to said second password and said second verification reference pattern, and fifth dissimilarities between said second verification input pattern and second control reference patterns, said first and second verification input patterns being input patterns outputted from said input analyzer when a speaker to be verified speaks said first and second passwords, respectively;
   a control reference pattern designator operating in response to an output of said pattern matching unit for selecting a plurality of first dissimilarities having the smallest of said first dissimilarities, to designate the first control reference patterns corresponding to the selected dissimilarities as the first control reference patterns corresponding to said registered number, and outputting said first control reference patterns to said pattern matching unit; and
   a judgement unit operating in response to an output of said pattern matching unit for generating a first confirmation signal when said second dissimilarity is less than both said third dissimilarities corresponding to said designated first control reference patterns and a predetermined threshold value, generating a second confirmation signal when said fourth dissimilarity is less than both all said fifth dissimilarities and a predetermined threshold value, and generating another confirmation signal when both said first and second confirmation signals are generated.

6. A speaker verification system according to claim 5, further comprising a switch for connecting the output from said input pattern buffer to said verification reference pattern memory during registration, and to said pattern matching unit and said control reference pattern memory during verification.

7. A speaker verification system according to claim 5, wherein said first and second passwords are different from each other, and wherein said second password is determined individually for each registered speaker.

8. A speaker verification system according to claim 5, wherein said first and second passwords are same passwords.

9. A method of verifying a speaker, comprising the steps of:
   a first speaking step of speaking a predetermined password under a variety of conditions;
   recording, as control reference patterns, patterns obtained from said first speaking step;
   a second speaking step of speaking said password by a registered speaker undergoing registration;
   recording, as a verification reference pattern, a pattern obtained from said second speaking step;
   a first determining step of determining first dissimilarities between said verification reference pattern and said control reference patterns;
   selecting a predetermined number of control reference patterns having the smallest first dissimilarities;
   a third speaking step of speaking said password; by a speaker to be verified;
   obtaining, as a verification input pattern, a pattern from said third speaking step;
   a second determining step of determining a second dissimilarity between said verification input pattern and said verification reference pattern;
   a third determining step of determining third dissimilarities between said verification input pattern and said selected control reference patterns; and
   outputting a confirmation signal that the speakers of said second and third speaking steps are the same when said second dissimilarity is both less than all said third dissimilarities are less than a predetermined threshold value.

* * * * *